INVENTOR.
SVEN ÅKE JÄRDMO

HIS ATTORNEYS

July 18, 1967    S. ÅKE. JÄRDMO    3,331,443
PROPELLER PITCH AND ENGINE FUEL CONTROL MEANS RESPONSIVE
TO PARAMETERS OF THE PROPELLER DRIVEN ENGINE
Filed Nov. 25, 1966    5 Sheets-Sheet 5

INVENTOR
SVEN ÅKE JÄRDMO
BY

HIS ATTORNEYS

United States Patent Office 3,331,443
Patented July 18, 1967

3,331,443
PROPELLER PITCH AND ENGINE FUEL CONTROL MEANS RESPONSIVE TO PARAMETERS OF THE PROPELLER DRIVEN ENGINE
Sven Åke Järdmo, Karlstad, Sweden, assignor to Aktiebolaget Karlstads Mekaniska Werkstad, Karlstad, Sweden, a company of Sweden
Filed Nov. 25, 1966, Ser. No. 596,960
Claims priority, application Sweden, Dec. 11, 1963, 13,744/63
7 Claims. (Cl. 170—135.72)

This is a continuation-in-part of my United States application Ser. No. 417,349, filed Dec. 10, 1964, now abandoned.

The present invention relates to control devices for regulating the supply of fuel to the engine of a ship and the pitch of the propeller blades of the ship, and more particularly, to devices responsive to the temperature in the mechanical parts of the engine and engine load to limit the engine speed and/or the pitch of a controllable pitch propeller connected to the engine to avoid overloading or overspeeding of the engine of the ship at low operating temperatures of the mechanical parts.

Speed governing devices are known which control the relation between the revolutions of the engine and the load developed by the propeller and enable the desired values of engine speed, engine load and propeller pitch to be set in advance in such a way that, for example, the fuel consumption is kept to a minimum. The use of such speed governing devices has certain disadvantages, however, when the engine of the ship consists of a big diesel engine. Diesel engines, before they reach working temperature, cannot be subjected to anything like normal full load without risk of abnormal wear or, in unfavorable cases, engine breakdown. The allowable power to be delivered by the engine is accordingly related to the engine temperature so that greater power can be supplied as the engine warms up.

When a ship leaves a quay or dock, the engine usually has not reached anything like full working temperature and, with large diesel engines, bringing them to operating temperature can take considerable time. During this time, that is, when running within a harbor area or in an archipelago, the master of the ship must keep his attention directed to other ships sailing in the vicinity and to marks or buoys in the shipping route, considerably more than when in open sea. Sometimes navigating actions must be taken rapidly and sometimes by utilization of the total maneuverability of the ship, and, consequently the risk of the engine being overloaded unintentionally or by oversight is much greater than normal.

Overloading or overspeeding of the engine could be avoided by providing means for limiting the control system to a maximum operating position corresponding to highest permissible load at lowest operating temperature. However, it is not desirable to reduce the range within which the control system can be adjusted for it would, in reality, reduce maneuverability by limiting the possibility of carrying out speed changes throughout the permissible operating range of engine speeds and propeller pitch changes at normal operating temperatures.

In accordance with the present invention, a control device or system is provided which regulates or limits the fuel supply and the propeller pitch, respectively, in response to the engine temperature and engine load, to such values that the engine speed does not become too high and the engine is not overloaded excessively under low or normal operating temperatures.

More particularly, in accordance with the invention, the new system includes a single control operated by a ship's officer for governing and controlling a ship's engine and the pitch of a controllable pitch propeller. The new system also includes mechanisms affected by signals derived from instruments arranged to sense engine temperature and engine load, which reduce the effect of the officer's control on the setting of propeller pitch and the speed of the engine at values of engine temperature and load which otherwise could involve damage to the engine, but nevertheless permit adjustment of propeller pitch and engine speed throughout a greater range when the engine is at its normal or optimum operating temperature.

In one form of the control system, the mechanism for controlling or affecting propeller pitch setting includes a servo-system including a variable feed-back amplifier, depending on signals derived from instruments sensing the engine temperature and load, in such a way that amplification in the feed-back line increases at low temperature or high load, and reduces the propeller pitch in a corresponding degree for any pitch setting of the officer's control device.

The signals affecting the servo-system which govern pitch setting and engine speed, respectively, may be pneumatic signals supplied by reducing valves in the control system so that an adjustment of the officer's control system, corresponding to desired increased ship speed causes a pressure change in the line for control of engine revolution and/or the like for control of propeller pitch setting when the engine is cold or below normal operating temperature. The instruments sensing engine temperature and load also include reducing valves arranged in such a way that the pressure supplied by the valves changes when the load increases and temperature decreases, respectively. In this way, the signals from the control device operated by the ship's officer are combined with the signals from the instruments sensing engine condition, in such a way that the effect of the officer's control device on propeller pitch setting and engine loads is reduced at lower engine temperatures.

For a better understanding of the invention, reference may be had to the accompanying drawing, in which.

Figure 1:
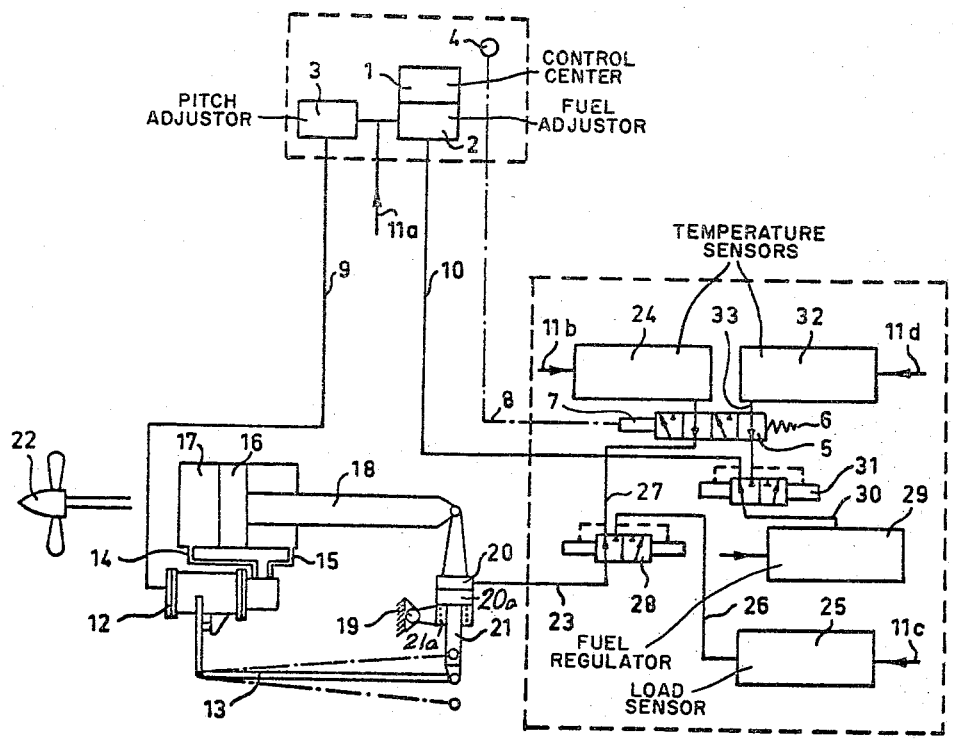
FIGURE 1 is a schematic illustration of a control system embodying the present invention.

The system shown in FIGURE 1 includes a control center 1 described hereinafter operated by a ship's officer arranged to affect both a control device 2, which is arranged to convert the adjustment of the control center 1 to a signal which regulates the fuel supply to the engine in a way to be described in more detail below, and also a control device 3, which adjusts the propeller pitch setting. Also, at the control center which may be located on a ship's bridge, is an actuating device 4 for bypassing or overriding the governing devices described below by means of an adjustable valve 5, which can be affected by electromagnetic signals but which normally is retained by means of a spring 6 in the relation shown on the drawing. The plug of the valve 5 can be moved endwise by means of a signal via line 8 which energizes the solenoid coil 7.

In the system shown in FIGURE 1, the signals emitted from the control device via lines 9 and 10 are pneumatic signals, and instruments 2 and 3 consist suitably of reducing valves actuated by means of cams or the like at the control center 1. Compressed air is supplied to the inlets of the valves by means of a pipe 11, from an air pressure source (not shown). The valves are further constructed and arranged so that an adjustment of the officer's controlling instrument 1, corresponding to a higher ship speed desired, causes a reduction of air pressure in the lines 9 and 10 connected to the discharge of the respective regulating valves.

The pressure in line 9 adjusts a balancing valve 12 of the pressure-actuated slide type including a slidable plug and a concentric slidable sleeve. Movement of the plug is accomplished by the pressure in line 9 and movement of the sleeve is affected by a lever 13. The valve 12 is connected by means of lines 14, 15 to each end of a cylinder 17, which is divided by a slidable piston 16 but otherwise closed. The piston 16 is provided with a piston rod 18 which is pivotally connected to an arm extending from one end of a cylinder 20 pivoted at 19 and a piston rod 21 connected to and movable with the piston 20a of the cylinder 20 to actuate the lever 13. The position of piston 16 in the cylinder 17 also controls the pitch of a controllable pitch propeller 22.

In general, the movement of the plug in the valve 12 by the signal or pressure in line 9 admits liquid to one of the pipes 14 and 15 to cause the piston 16 to move in one direction or the other in the cylinder. Movement of the sleeve in the valve 12 in response to movement of the piston 16 and lever 13 shuts off the flow of liquid to the pipe 14 or 15. Valves of the type described are well-known in the art.

The elements 12 to 19 form, as shown, a servo-circuit in which the piston 16, cylinder 17 and piston rod 18 form a servo-motor or amplifier, the cylinder 20, piston rod 21 and lever 13 form a feed-back control which moves the piston 16 to a position corresponding to a propeller pitch setting selected by the officer's control station 1. In other words, the signal supplied via line 9 and the signal fed back by lever 13 causes the liquid to be supplied by the pipe 14 or 15 to move the piston 16 to a desired position and then stop it at that position. When the valve 12 is in balanced position, i.e, when it is equally affected from the line 9 and the arm 13, both pipes 14 and 15 are closed so that the piston 16 is kept in the position it then takes.

The servo-system described is only to be considered as an example for one of several possible hydraulic, electric, or pneumatic servo-systems, which could be used in the present case. A noticeable feature of the system is the arrangement of the cylinder 20 and the piston rod 21. If compressed air is led to the cylinder 20 by way of the pipe 23, the piston rod 21 will be projected from the cylinder farther against the action of a spring 21a therein, the projection of the piston rod providing "amplification" of movement of the lever 13 in the feed-back line tending to reduce the movement of the piston 16 in response to a signal from the control center 1.

The cylinder 20 and piston rod 21 can be considered as a variable amplifier connected in the feedback line, the function of which is such that, if amplification is increased, the signal leaving the servo-system, i.e., the movement of piston rod 18, will be less than what a signal, i.e., change of pressure in line 9, would cause if amplification in the feed-back line, i.e., the total length of cylinder 20 and piston rod 21 was maintained unchanged. By projecting or retracting the piston rod 21 in response to engine temperature, the effect of the officer's control center 1 on propeller pitch can be varied within the same limits and each change in the adjustment of the controlling instrument causes a change in ship speed by adjusting the pitch of the propeller 22.

The actual change in propeller pitch will be limited in response to low engine temperature or to engine overload by the new system. This is effected in the following way: The engine is provided with a temperature-sensing device 24, such as a bimetallic thermostat which either can sense the temperature of the cooling medium, for example, in the cylinder head of the engine or in another suitable way. The device 24 may, for example, consist of a reducing valve, actuated by the bimetallic thermostat. Compressed air is supplied to the valve by means of a pipe 11b and the valve is constructed and arranged so that when engine temperature increases, the valve delivers compressed air with decreasing pressure.

The engine is further provided with an engine load responsive device 25, such as a dynamometer which, as the engine load exceeds the normally allowable value, emits a signal. The device 25 also includes a reducing valve, which on its inlet side is supplied with compressed air via pipe 11c and is constructed and arranged so that the pressure in the discharge pipe 26 increases as the engine load increases.

As shown in FIGURE 1 the valve 5 described hereinafter is interposed between the sensing devices 24 and 25 and the pipes 26 and 27 both of which are connected to ports in a shuttle valve 28. As shown by the dotted lines, the valve 28 described hereinafter is responsive to the pressure in the lines 26 and 27 so that a passage in a valve plug therein is connected to either pipe 26 or pipe 27 and to the discharge line 23, depending upon which of the pipes 26 and 27 supplies air at the greatest pressure.

Line 23 is, as indicated before, connected to the cylinder 20 so that the total length of the cylinder 20 and piston rod 21 will be affected by that signal (pressure) derived from devices 24 and 25 respectively which dominates at that moment. The pitch of the controllable pitch propeller 22 will thus not only depend on the adjustment of the control center 1 and the pressure in line 9 which it calls for, but also on the engine temperature or its load as these approach predetermined critical values.

In addition, the system is provided with an engine speed control device 29, described hereinafter for example, for regulating the fuel supply to the engine by changing the stroke of the fuel injecting pumps for the cylinders of the engine. The pressure supply line 30 for control 29 is connected to the outlet of a valve 31 like the valve 28, which connects the line 30 to one of two air pressure supply inlet pipes. The valve automatically connects the pipe having the highest pressure to the supply line 30. One of the supply lines to valve 31 is, as shown in the drawing, line 10 coming from the control center 1 and by means of the controller 2 supplies the pilot signal for governing the speed of the engine. The engine is further provided with another temperature-sensing device 32 like the device 24 and which is supplied with compressed air by means of the pipe 11d. The discharge pipe 33 of the temperature-sensing device 32 is connected to the second inlet of valve 31 by means of the valve 5. The engine speed control device 29 is constructed so that the engine speed is increased in proportion to the reduction of pressure in pipe 30. The engine speed will therefore be determined and limited by that one of the two air pressure signals arriving at valve 31, which at that moment has the highest pressure.

The characteristics of the device described can be summarized as follows:

The officer's control center 1 is adjustable over its whole normal range, independently of the engine temperature and engine load.

Each change of the adjustment of the officer's control 1 involves a change of pitch of the controllable pitch propeller 22. The amount, with which pitch changes, will, however, depend not only on the adjustment of the officer's control center but also on the engine temperature and engine load.

The structure of the new system and the characteristics of its components described also make clear that, if the control center 1 is set to a position, for example, corresponding to highest possible ship speed, while the engine has not yet reached working temperature, the ship speed will at the beginning be somewhat less than the highest possible speed and will be determined by the amount of the pressure in line 23 transmitted from the temperature-sensing device 24 to the cylinder 20. Increased pressure in the cylinder 20 causes the piston rod 21 to be projected farther and this in turn, balances the valve 12 with lesser movement of the piston 16 and lesser change in the pitch of the propeller 22. As the engine temperature rises and the pressure, as indicated, drops in corresponding degree, the adjustment of the control center 1 being maintained unchanged, the propeller pitch and thus also the ship speed will increase as the diminishing pressure causes the total length of the cylinder 20 and piston rod 21 to decrease. The valve 12 will automatically provide such adjustment by enabling the piston 16 to be moved in a direction towards increasing propeller pitch until the balance in valve 12 is restored.

Depending on the circumstances, increase in propeller pitch will continue until the propeller pitch, via a signal from the device 25 sensing the engine load, is adjusted to its highest value predetermined by trim of the load measuring device 25.

The engine speed cannot be increased beyond the value which is set as limit by the temperature-sensing device 32. This means that with cold engine a change of adjustment of the controlling instrument 1 only involves a corresponding change of the engine speed at values which correspond to a pressure in the line 10 which is less than the pressure in line 33 from device 32.

When the temperature rises, however, the same function is obtained as concerning propeller pitch, i.e., the pressure in line 33 drops so that the engine speed increases in correspondning degree. Depending on the trim, the pressure in line 33 will, at full engine working temperature, eventually be below the highest possible pressure in line 10, so that the valve 31 is adjusted to connect the line 10 to the governor 29 and the speed at working temperature can hereby be caused to change under the control of the officer's control center 1.

As is evident, the highest value of speed setting is not, like the pitch control, directly dependent on the highest permissible engine load. It is understood that load-control of the speed setting is not necessary for the reason that the engine load, independent on its speed, would be reduced, if it becomes too high, by the action of the load responsive device 25 on propeller pitch setting.

Figure 2:
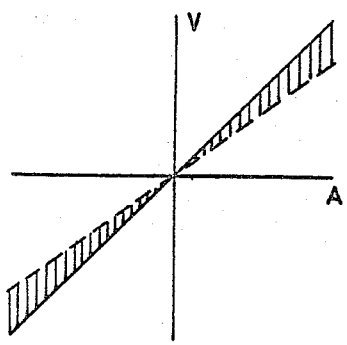
FIGURE 2 is a graphic illustration of the relation between adjustment of the controlling instruments and the resulting ship speed, when a control device according to the invention is used.

The curve in FIGURE 2 shows how the device according to the invention functions at varying engine temperatures. The solid line curve gives the ship speed as a function of the adjustment of the officer's control 1 under warm engine conditions while the broken line discloses the conditions with a cold engine. The hatched range between the lines corresponds to the working ranges under conditions lying between cold and warm engine temperatures. It should be noted that, independent of the condition of the engine, the passage between drive ahead (first quadrant) and astern (third quadrant) always lies at the origin. The reason for this is that propeller pitch adjustment is affected by a servo-system, the response of which is not influenced by change of amplification in the cylinder 17 and piston 16, but by change of amplification in the cylinder 20 and piston 21.

The typical embodiment of the invention described above, can of course, be modified and altered, both with respect to the structure of the single components and their coordination with each other, without departing from the concept of the invention.

Figure 3:
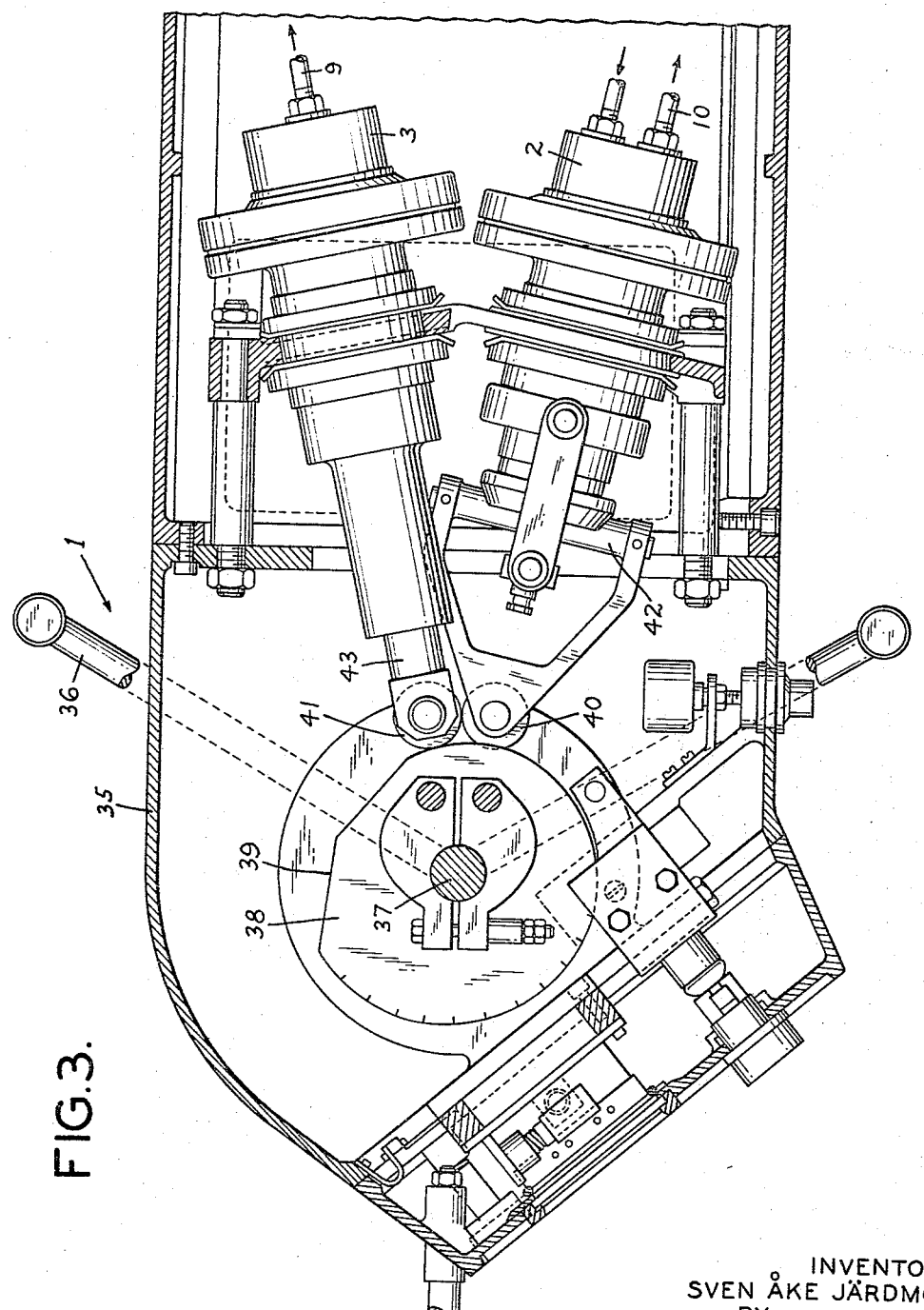
FIGURE 3 is a view in longitudinal section through the controller of the system.
Figure 4:
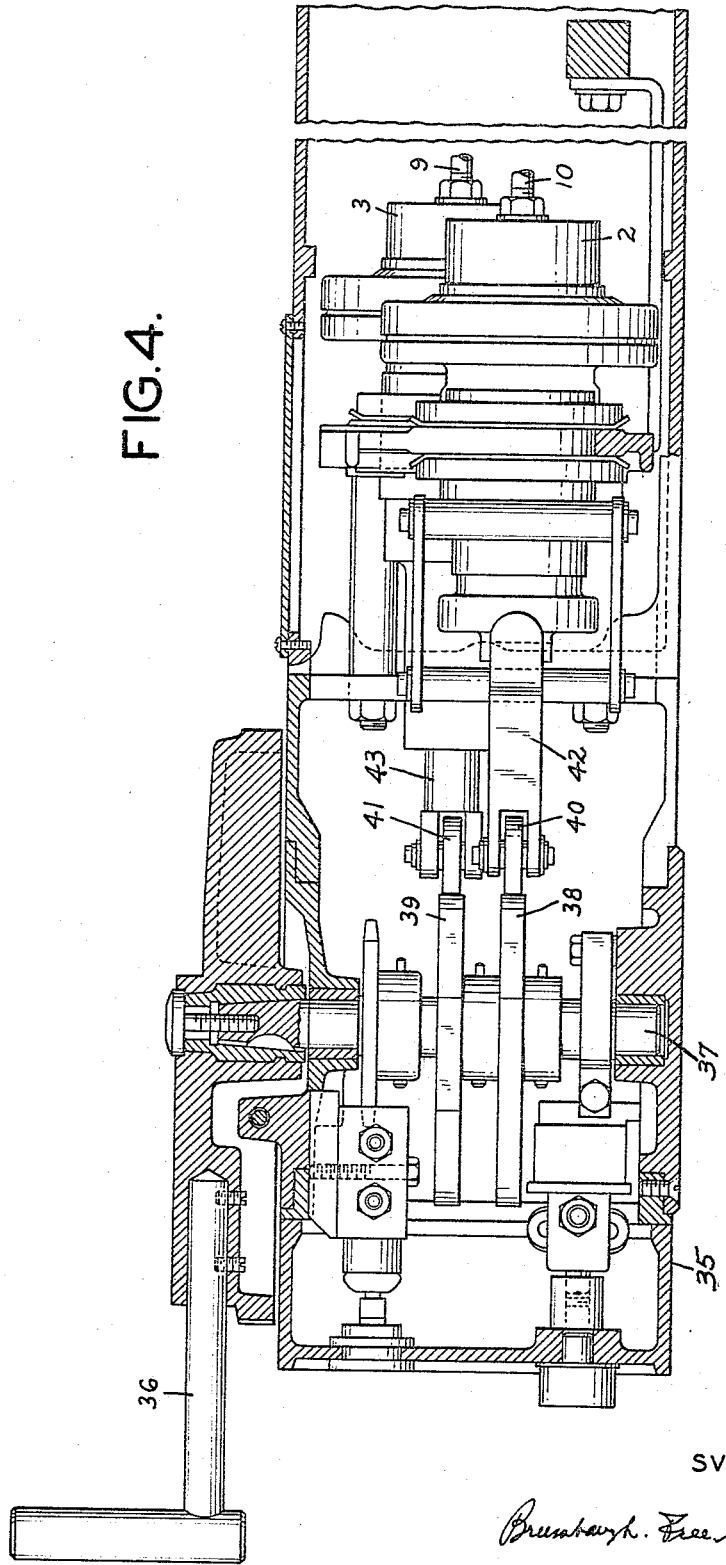
FIGURE 4 is a view in section taken on line 4—4 of FIGURE 3.
Figure 5:
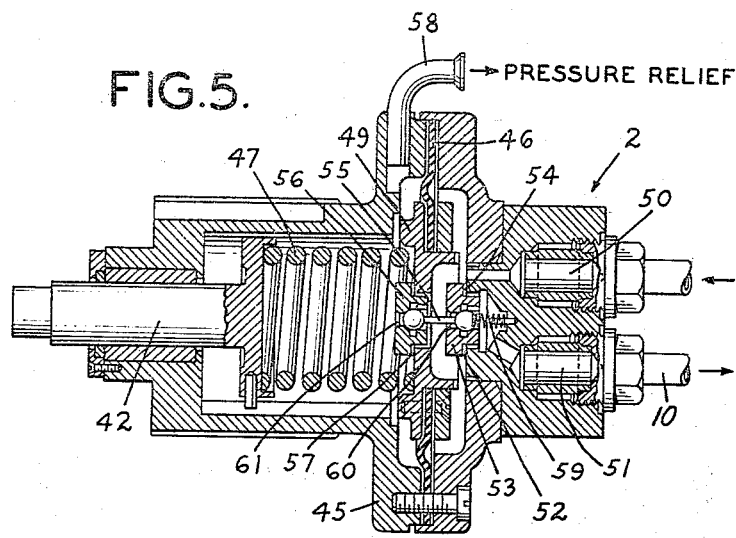
FIGURE 5 is a view in section of a pressure-regulating valve.

As indicated above, the valves and controls of the pneumatic system may be conventional commercially available products. The following is a general description of typical valves and controller components which are suitable for use in the new system. Referring to FIGURES 3, 4 and 5, the controller 1 is similar to the controller disclosed in Smalley et al. aPtent No. 3,088,523. It includes a housing 35 of any suitable type to be mounted in the pilot house of the ship and includes a control lever 36 which can be swung between positions indicated generally in FIGURE 3. A shaft 37 is rotatably mounted in the housing 35 and is turned by means of the control handle 36. A pair of cams 38 and 39 are fixed to the shaft 37 and are engaged by means of follower rollers 40 and 41 which are connected to plungers 42 and 43 for adjusting the pressure regulating valves 2 and 3, as described above. As shown in FIGURE 5, the pressure regulating valves, of which valve 2 is an example, are of the diaphragm type and include a casing 45 which is spanned by a diaphragm 46 normally biased to the right as viewed in FIGURE 5 by means of a coil spring 47 which engages the valve seat plate 49 on the diaphragm and the plunger 42. At the right-hand end of the casing in an inlet passage 50 connected to a source of pneumatic pressure and an outlet passage 51 which in the case of valve 2 is connected to the conduit 10 as described above. Between the passages 50 and 51 is a valve seat 52 which cooperates with a valve plug 53 having small leak ports 54 therein. A dumbbell coupling and valve 55 connects the plug 53 to a plug 56 which cooperates with the valve seat plate 49, this valve plug also having small leak ports 57 therein to allow pressure to leak past the diaphragm through pressure relief and return line 58. A light spring 59 normally biases the dumbbell valve and connector so that the balls thereof engage in seats in passages 60 and 61 through the valve plugs 53 and 57 keeping them normally closed. It will be apparent that the pressure supplied at the port 50 will normally tend to bias the diaphragm to the left tending to unseat the valve plug 53 but the spring 47 opposes this pressure with a pressure which can be varied depending upon the endwise dispalcement of the plunger 42 and compression of the spring 47. The more the spring 47 is compressed, the lower the gas pressure is at the discharge port 51. By adjusting the position of the plunger 42 by means of the cam 38, a greater or lesser pressure of air can be supplied to the discharge passage 51 and the conduit 10.

The pressure of the air flowing through the conduit 9 can be regulated by means of the same kind of pressure regulating valve 3. The other pressure regulating valves referred to in the specification may be of the same or equivalent type.

Figure 6:
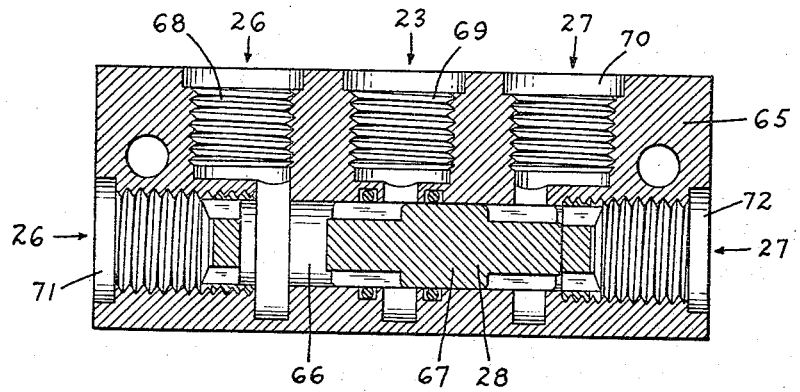
FIGURE 6 is a view in longitudinal section of a shuttle valve.

The shuttle valves 28 and 31 referred to above may be of the type shown in FIGURE 6. By way of example, the valve 28 includes a casing 65 having a longitudinal bore 66 therein which is slidably received a shuttle valve plug 67 having an enlarged mid portion fitting the bore 66 in fluid tight relation. Spaced lengthwise of the casing 65 are three ports, 68, 69 and 70 connected respectively to the conduits 26, 23 and 27. Ports 71 and 72 are connected, respectively, to the conduits 26 and 27. Inasmuch as the plug 67 is freely slidable in the bore 66, when the pressure at the port 72 (in the conduct 27) is less than the pressure at the port 71 (in the conduit 26) the valve plug will be forced to the position shown shutting off communication between the port 70 and the port 69 while permitting communication between the port 68 and the port 69, thus allowing gas to flow from the conduit 26 to the conduit 23. When the pressure in the conduit 27 is higher than the pressure in the conduit 26, the valve plug 67 is forced to the left, shutting off communication between the port 68 and the port 69 and connecting the port 69 to the port 70.

Figure 7:
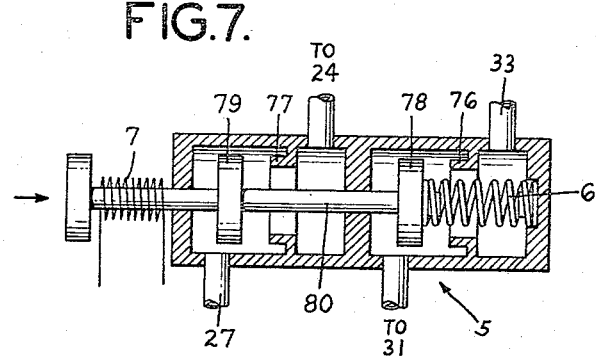
FIGURE 7 is a view in section of a solenoid control valve.

FIGURE 7 illustrates a typical solenoid control valve 5. This valve includes a hollow casing 75 having a pair of valve seats 76 and 77 therein for cooperation with the valve plugs 78 and 79 which are fixed to a plunger 80 which passes through the solenoid coil 7. A spring 6 biases the valve plug 78 and 79 away from the seats 76 and 77 when the coil 7 is deenergized, thereby permitting communication between the controller 24 and the conduit 27 and between the conduit 33 and the shuttle valve 31. When the solenoid 7 is energized, the valve plugs 78 and 79 are forced against their respective seats 76 and 77, thereby shutting off communication between controller 24 and conduit 27 and between conduit 33 and shuttle valve 31.

Figure 8:
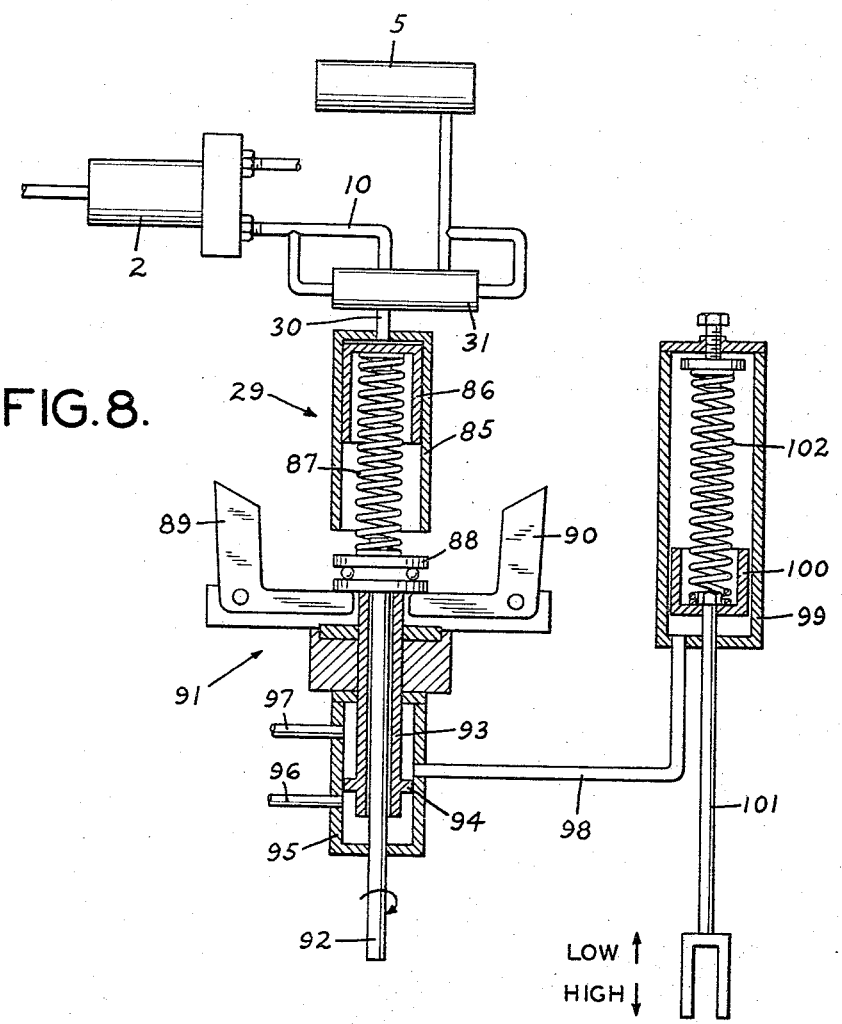
FIGURE 8 is a schematic illustration of the centrifugal governor control of an engine fuel supply for the system embodying the present invention.

The engine speed governor may likewise be of any suitable type, such as, for example, a Woodward type of controller, the essential features of which are shown schematically in FIGURE 8.

As indicated above, the pressure regulating valve 2 is connected by means of the conduit 10 to the shuttle valve 31 and one passage through the valve is connected by means of the conduit 30 to the engine speed governor 29. The air pressure in the conduit 30 from the reduction valve 2 or the thermostat control 32 (whichever supplies the higher pressure) can be supplied to a cylinder 85 containing a piston 86 which is forced downwardly by the air pressure and compresses a spring 87 which bears at its lower end against a thrust bearing member 88 for urging the weights 89 and 90 of an engine driven governor 91 to the inner position. The governor may be driven by means of a shaft 92 connected to the engine. As the engine speed increases, the weights 89 and 90 to tend to swing outwardly, the inner ends of the weights press against the thrust bearing 88 and tend to compress the spring 87 at the same time moving a sleeve 93 having a valve plug 94 thereon upwardly relative to a valve casing 95 having a discharge passage 96 and an inlet port 97 connected to a source of pneumatic or hydraulic pressure. The extent of displacement of the sleeve 93 at a given engine speed is determined by the extent of compression of the spring 87 by the piston 86 and the air pressure supplied by the conduit 30. When the valve plug 94 is in its lower range of movement because of high compression of spring 87 as shown in FIGURE 8, a condition existing when the controller 1 is set for low speed or when the engine is cold, communication is established between the pressure conduit 97 and a pressure supply conduit 98 which is connected to a cylinder 99 moving upwardly a piston 100 therein and a shaft 101 by means of which the fuel supply to the engine is decreased. Upward movement of the piston 100 is resisted by means of a spring 102 which can be adjusted for a desired engine speed range. When the gas pressure supplied by the conduit 30 is low, the governor weights can swing outwardly farther against the resistance of the spring 87 and the valve plug 94 can move upwardly farther between the inlet passage or port 96 and the inlet of the conduit 98, venting the fluid from the cylinder 99 and allowing the spring to force the piston 100 downwardly and make a corresponding increase in the fuel supply to the engine thereby increasing engine speed.

It will be understood that a higher gas pressure supplied by the pressure regulating valve 2 or the thermostatic control 32 tends to decrease engine speed while a lower gas pressure increases engine speed, consequently, where the regulating valve 2 is adjusted for low gas pressure and high engine speed and the engine is cold, the controller 32 will override the controller 1 and will maintain the engine at a lower operating speed.

In commercially available Woodward controllers, refinements are, of course, available for giving a more precise adjustment of engine operation. Additional valving and fluid circuitry are included to regulate more precisely the operation of the controller.

Other types of controllers are, of course, useful in the new system, the principal purpose being to obtain the above-described reduction of maximum engine speed during the warm up period of avoid overstressing of the engine and to allow full range engine operation after the engine has warmed up sufficiently to avoid damage thereto.

These and other changes are included within the scope of the invention as defined in the following claims.

I claim:
1. A control system for ships and the like having an internal combustion engine and a variable pitch propeller driven by said engine comprising a control center having means adjustable to different settings for controlling the supply of fuel to said engine and the pitch of said propeller, and means responsive to the temperature of the mechanical parts of said engine for reducing the effect of said control center means on the pitch of said propeller to maintain said propeller at a lower operating pitch at low engine temperature and increasing the effect of said control center means on said pitch at higher engine temperatures to maintain said propeller at a higher operating pitch.

2. The control system set forth in claim 1 comprising means responsive to the temperature of the mechanical parts of said engine for reducing the effect of said control center means on the fuel supply to said engine to reduce the rate of fuel supply to the engine at lower engine temperature and increasing the effect of said control center means on said fuel supply to said engine and increase the rate of the fuel supply at higher engine temperatures.

3. The control system set forth in claim 1 comprising means responsive to the load of said propeller on said engine for reducing the effect of said control center means on the pitch of said propeller to maintain said propeller at a lower pitch under higher propeller loads and increasing the effect of said control center means on propeller pitch to maintain said propeller at a higher pitch under decreasing propeller loads on said engine but influenced by the means responsive to temperature so that these will override the loadsensing device should the temperature in the mechanical parts of the engine be too low.

4. The system set forth in claim 3 comprising means at said control center for rendering said temperature and load responsive means ineffective.

5. The control system set forth in claim 1 in which said means at said control center for varying the pitch of said propeller comprises a signalling means, a servo-mechanism connected with said propeller for varying its pitch in proportion to signals from said signalling means, variable amplifying means connected to said servo-mechanism for limiting the variation in pitch of said propeller in response to said signal, and means responsive to the temperature of the mechanical parts of said engine for varying the amplification of the amplifier to reduce the effect of said signal for varying propeller pitch to reduce said pitch when said engine is below normal operating temperature.

6. The control system set forth in claim 5 in which said servo-mechanism comprises a first cylinder, a piston movable therein, a valve responsive to said signal for moving said piston in said cyclinder in proportion to the variation in pitch of said propeller and said amplifier comprises a second cylinder and a second piston movable therein connected to said valve and said first piston to actuate said valve and stop movement of said first piston in said first cylinder and limit the variation in pitch of said propeller and said means responsive to said engine temperature comprises means for supplying fluid pressure to said second cylinder to vary the position of said second piston therein to actuate said valve to vary the pitch of said propeller to a different value than in proportion to said signal.

7. The system set forth in claim 5 comprising means responsive to load on said engine by said propeller for varying the amplification of said amplifier to reduce variation in propeller pitch at higher engine loads and increase variation in propeller pitch under decreased engine loads but also influenced by the means responsive to temperature so that these will override the loadsensing device should be temperature in the mechanical parts of the engine be too low.

References Cited

UNITED STATES PATENTS

| | | | |
|---|---|---|---|
| 2,231,292 | 2/1941 | Neugebauer | 170—135.72 |
| 2,694,900 | 11/1954 | Brandau | 170—135.72 X |
| 3,110,348 | 11/1963 | Greiner | 170—135.74 |

JULIUS E. WEST, *Primary Examiner.*